(12) United States Patent
Stromberg et al.

(10) Patent No.: US 8,449,724 B2
(45) Date of Patent: May 28, 2013

(54) METHOD AND SYSTEM FOR THE TORREFACTION OF LIGNOCELLULOSIC MATERIAL

(75) Inventors: Bertil Stromberg, Diamond Point, NY (US); Joseph Monroe Rawls, Queensbury, NY (US)

(73) Assignee: Andritz Technology and Asset Management GmbH, Graz (AT)

( * ) Notice: Subject to any disclaimer, the term of this patent is extended or adjusted under 35 U.S.C. 154(b) by 278 days.

(21) Appl. No.: 12/832,614

(22) Filed: Jul. 8, 2010

(65) Prior Publication Data

US 2011/0041392 A1    Feb. 24, 2011

Related U.S. Application Data

(60) Provisional application No. 61/235,114, filed on Aug. 19, 2009.

(51) Int. Cl.
*C10B 53/02*    (2006.01)

(52) U.S. Cl.
USPC ............... 202/96; 202/109; 202/117; 34/131; 34/138; 422/621

(58) Field of Classification Search
USPC ............... 585/240, 242; 44/605; 202/96, 109, 202/117; 422/621; 34/131, 138
See application file for complete search history.

(56) References Cited

U.S. PATENT DOCUMENTS

| | | | |
|---|---|---|---|
| 864,186 | A | 8/1907 | Ostertag |
| 1,172,576 | A | 2/1916 | Benjamin |
| 2,159,027 | A | 5/1939 | Jalma et al. |
| 2,869,249 | A | 1/1959 | Kamp |
| 2,903,400 | A | 9/1959 | Poindexter et al. |
| 2,913,780 | A | 11/1959 | Weisselberg |
| 3,681,855 | A | 8/1972 | Weisselberg et al. |
| 3,728,797 | A | 4/1973 | Worden, Sr. et al. |
| 3,777,409 | A | 12/1973 | Weisselberg et al. |
| 3,787,292 | A | 1/1974 | Keappler |
| 4,077,847 | A | 3/1978 | Choi et al. |
| 4,098,649 | A | 7/1978 | Redker |
| 4,285,773 | A | 8/1981 | Taciuk |
| 4,553,978 | A * | 11/1985 | Yvan .............................. 44/280 |
| 4,787,917 | A | 11/1988 | Leclerc de Bussy |
| 5,017,269 | A | 5/1991 | Loomans et al. |
| 5,183,148 | A | 2/1993 | Kondo |
| 5,279,712 | A | 1/1994 | Constantine |
| 5,725,738 | A | 3/1998 | Brioni et al. |

(Continued)

FOREIGN PATENT DOCUMENTS

| BE | 444413 | 2/1942 |
|---|---|---|
| CH | 20332 | 1/1901 |

(Continued)

OTHER PUBLICATIONS

Bergman et al., "Torrefaction for Biomass Co-Firing in Existing Coal-Fired Power Stations," ECN Biomass, ECN-C-05-013; Jul. 2005, 71 pages.

(Continued)

*Primary Examiner* — Nina Bhat

(74) *Attorney, Agent, or Firm* — Nixon & Vanderhye P.C.

(57) ABSTRACT

Systems and methods for producing torrefied lignocellulosic material in a commercially suitable process.

11 Claims, 1 Drawing Sheet

U.S. PATENT DOCUMENTS

| | | | |
|---|---|---|---|
| 6,048,374 | A | 4/2000 | Green |
| 6,558,644 | B1 | 5/2003 | Berman |
| 6,588,349 | B1 | 7/2003 | Ahtila et al. |
| 7,159,723 | B2 | 1/2007 | Hilpert et al. |
| 8,061,140 | B2 | 11/2011 | Harmon, Sr. |
| 8,105,400 | B2 | 1/2012 | Bergman |
| 8,161,663 | B2 * | 4/2012 | Weisselberg et al. ............ 34/505 |
| 8,203,024 | B2 * | 6/2012 | Leonhardt ..................... 585/240 |
| 8,252,966 | B2 * | 8/2012 | Teal et al. ...................... 585/240 |
| 8,276,289 | B2 | 10/2012 | Causer |
| 2003/0221363 | A1 * | 12/2003 | Reed ............................... 44/594 |
| 2004/0220435 | A1 | 11/2004 | Stubbing |
| 2006/0130396 | A1 | 6/2006 | Werner |
| 2006/0280669 | A1 | 12/2006 | Jones |
| 2007/0084385 | A1 | 4/2007 | Lana et al. |
| 2007/0220805 | A1 | 9/2007 | Leveson et al. |
| 2007/0266623 | A1 | 11/2007 | Paoluccio |
| 2008/0022565 | A1 * | 1/2008 | Sandy ............................. 40/124 |
| 2008/0022595 | A1 | 1/2008 | Lemaire et al. |
| 2008/0201980 | A1 | 8/2008 | Bullinger et al. |
| 2008/0223269 | A1 | 9/2008 | Paoluccio |
| 2009/0007484 | A1 | 1/2009 | Smith |
| 2009/0018222 | A1 | 1/2009 | Klepper et al. |
| 2009/0084029 | A1 | 4/2009 | Bergman |
| 2010/0242351 | A1 | 9/2010 | Causer |
| 2011/0154684 | A1 | 6/2011 | Lundgen et al. |
| 2011/0265734 | A1 | 11/2011 | Kim et al. |
| 2011/0314728 | A1 | 12/2011 | Camper et al. |

FOREIGN PATENT DOCUMENTS

| | | |
|---|---|---|
| CH | 153757 | 4/1932 |
| DE | 3041627 | 6/1982 |
| DE | 3211590 | 10/1983 |
| DE | 3502446 | 7/1986 |
| DE | 3721006 | 12/1988 |
| DE | 4334558 | 3/1994 |
| DE | 19614689 | 10/1997 |
| DE | 19932822 | 1/2001 |
| DE | 102004038730 | 2/2006 |
| DE | 202007013672 | 11/2007 |
| DE | 102009052902 | 10/2010 |
| DE | 102009020337 | 11/2010 |
| EP | 0385514 A1 | 9/1990 |
| EP | 0385514 B1 | 9/1992 |
| EP | 1890080 | 2/2008 |
| EP | 1990399 | 11/2008 |
| EP | 2017325 | 1/2009 |
| FR | 538040 | 6/1922 |
| FR | 574507 | 7/1924 |
| FR | 29060 | 5/1925 |
| FR | 686708 | 7/1930 |
| FR | 39349 | 10/1931 |
| FR | 839732 | 4/1939 |
| FR | 872164 | 6/1942 |
| FR | 881793 | 5/1943 |
| FR | 886071 | 10/1943 |
| FR | 906950 | 2/1946 |
| FR | 933026 | 4/1948 |
| FR | 953004 | 11/1949 |
| FR | 976640 | 3/1951 |
| FR | 977529 | 4/1951 |
| FR | 993131 | 10/1951 |
| FR | 55506 | 9/1952 |
| FR | 2512053 | 3/1983 |
| FR | 2525231 | 10/1983 |
| FR | 2591611 | 6/1987 |
| FR | 2624876 | 6/1989 |
| FR | 2757097 | 6/1998 |
| FR | 2786426 | 6/2000 |
| FR | 2903177 | 1/2008 |
| JP | 02167024 | 6/1990 |
| JP | 05340241 | 12/1993 |
| JP | 2009174313 | 8/2009 |
| NL | 1025027 | 6/2005 |
| NL | 1029909 | 3/2007 |
| NL | 1032001 | 12/2007 |
| WO | WO 89/05847 | 6/1989 |
| WO | WO 2005/056723 | 6/2005 |
| WO | WO 2006/034581 | 4/2006 |
| WO | WO 2007/078199 | 7/2007 |
| WO | WO 2007/145507 | 12/2007 |
| WO | WO 2009/094736 | 8/2009 |

OTHER PUBLICATIONS

Prins et al., Energy, 31;3458-3470 (2006).
CMI, Industrial Wood Roasting, Intellectual Property Technologies. (2009).
U.S. Appl. No. 61/195,092, filed Oct. 3, 2008.

* cited by examiner

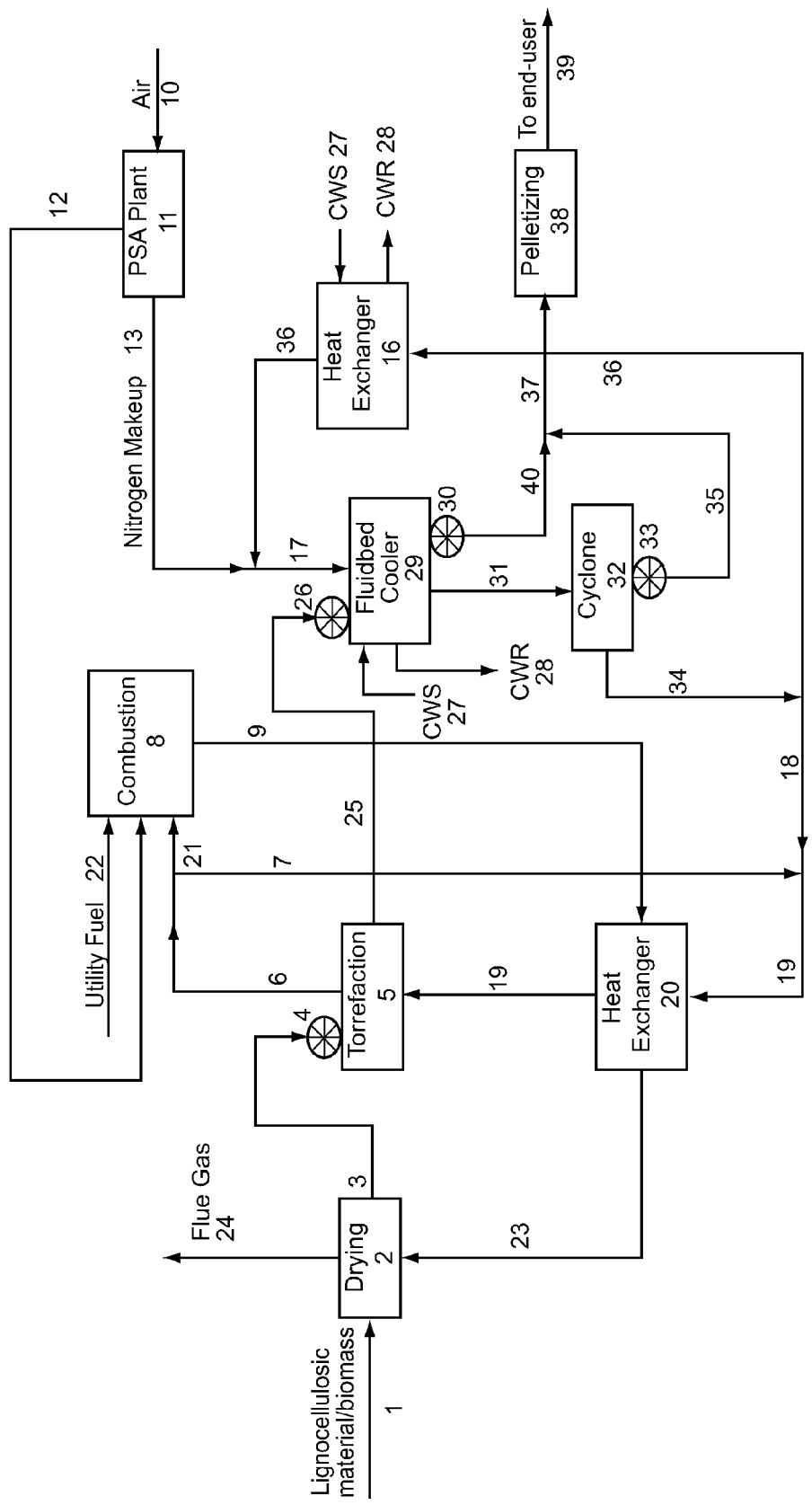

METHOD AND SYSTEM FOR THE TORREFACTION OF LIGNOCELLULOSIC MATERIAL

RELATED APPLICATION

This application claims priority to U.S. Provisional App. No. 61/235,114, filed on Aug. 19, 2009, the entirety of which is incorporated by reference

BACKGROUND OF THE INVENTION

The present invention generally relates to systems and methods relating to the torrefaction of lignocellulosic material.

Torrefaction refers to the thermal treatment of wood, usually in an inert atmosphere, at relatively low temperatures of 225 to 300° C. Torrefaction generally results in a fuel with increased energy density relative to the mass, by the decomposition of reactive hemicellulose content of the wood.

Wood generally contains hemicellulose, cellulose, and lignin. In an aspect, the goal of torrefaction is to remove moisture and low weight organic volatile components from the wood. Torrefaction may also depolymerize the long polysaccharide chains of the hemicellulose portion of the wood and produce a hydrophobic solid product with an increased energy density (on a mass basis) and improved grindability. Because of the change in the chemical structure of the wood after torrefaction, it can be suitable for use in coal fired facilities (torrefied wood or biomass has the characteristics that resemble those of low rank coals) or can be compacted into high grade pellets replacing standard wood pellets.

Torrefaction has developed over the last few decades as a possible method to turn wood based biomass into a viable addition to the spectrum of energy products. Although there has been much research into the compositional changes that occur in the biomass (wood) while undergoing torrefaction, commercial processes are not well developed. The torrefaction method and system put forth here has been developed to meet the commercial need for a viable torrefaction process. Other torrefaction processes are described in: U.S. Patent Pub. No. 2008/0223269, in which conduction heat is used to achieve torrefaction; U.S. Pat. No. 4,787,917, in which torrefied wood is formed into sticks of unbarked wood; and PCT Pub. No. WO 2005/056723, in which a continuous method and system produces torrefied biomass from raw material (organic material and originate from forestry or other agriculture and material of fossil nature or mixture—lignocellulose).

BRIEF DESCRIPTION OF THE INVENTION

Torrefaction of the wood material typically produces three products: a solid product of dark color which can be further processed to pellets or used directly as biomass fuel; an acidic phase comprised of condensable organics (including, but not limited to acetic acid, formic acid, acetone, furfural); and gases such as carbon monoxide or carbon dioxide. In an aspect the process may be a low temperature, low oxygen pyrolysis process where the easy to remove compounds having the lowest heat and energy values are removed.

In an aspect of this process, approximately 30% of the mass is burned off while losing only 10% of the energy value, that is to say the remaining solid mass (approximately 70% of the original material mass) contains 90% of the heat value originally present. Torrefaction may occur in a pressurized reactor and a temperature of 220-300° C. where there is direct contact of the raw material/biomass (lignocellulosic material), which has been previously dried to remove up to approximately 95% of the moisture initially present in the biomass, with hot gas (relatively oxygen free gas). Heating of the dried biomass in the torrefaction reactor may remove the remaining water from the biomass.

In an aspect, there is a system for the torrefaction of lignocellulosic material. The system may include: a dryer for drying lignocellulosic material adapted to remove at least of a portion of moisture contained within the lignocellulosic material; a torrefaction reactor adapted to operate at a pressure between 1 and 50 bar and at a temperature between 100 and 1000° C., wherein the torrefaction reactor generates torrefied biomass and a torrefaction gas from the lignocellulosic material; a first recycle loop adapted to recycle torrefaction gas back to the torrefaction reactor; a cooler adapted to cool torrefied biomass, wherein the cooler is adapted to operate in a substantially oxygen-free environment; a cyclone adapted to separate the cooled torrefied biomass from an inert gas; a second recycle loop adapted to recycle the inert gas from the cyclone to the cooler and to provide the inert gas to the torrefaction reactor; and a supply line adapted to supply inert gas for addition to the cooler. The system may be adapted to use the inert gas as a medium for transferring heat among the torrefaction reactor and the cooler.

In another aspect, there is a method for the torrefaction of lignocellulosic material comprising the steps of: drying lignocellulosic material to remove at least a portion of the moisture contained within the lignocellulosic material; reacting the dried lignocellulosic material at a pressure between 1 and 50 bar and at a temperature between 100 and 1000° C. in a torrefaction reactor to generate torrefied biomass and torrefaction gas; recycling at least a portion of the torrefaction gas back to the torrefaction reactor; cooling the torrefied biomass in the cooler operating in a substantially oxygen-free environment; separating the torrefied biomass and an inert gas in a cyclone; recycling a portion of the inert gas separated in the cyclone to the cooler and recycling a portion of the inert gas separated in the cyclone to the torrefaction reactor; supplying make-up inert gas to the cooler. The method may use the inert gas as a medium for transferring heat among the torrefaction reactor and the cooler.

BRIEF DESCRIPTION OF THE DRAWINGS

FIG. 1 is a schematic flowchart illustrating an embodiment of the present invention.

DETAILED DESCRIPTION OF THE INVENTION

FIG. 1 schematically illustrates a commercial-scale facility capable of torrefaction of biomass (lignocellulosic material). The embodiment of FIG. 1 takes advantage of heat from the process while maintaining an oxygen-free (i.e., substantially oxygen-free) environment, which is beneficial for safe, efficient operation.

In the illustrated process, biomass material is fed via conduit 1 to a drying device 2, which is any conventional or nonconventional drying device capable of removing between 85 and 98% of the moisture present in the biomass. In the illustrated drying device 2, the moisture present in the biomass is removed by energy supplied via hot gas 23. The dryer may remove a sufficient amount of moisture such that an absolute moisture content of the dried lignocellulosic material is less than 15% of the total weight of the lignocellulosic material. In the depicted embodiment, hot gas in conduit is the result of flue gas in conduit 9 from the combustion unit 8 after the flue gas has been cooled slightly by an indirect heat exchanger 20. Heat exchanger 20 facilitates recycling the energy in the hot flue gas 9 back to the torrefaction reactor 5 via conduit 19 for use in heating the reactor 5.

The drying gas fed to dryer 2 via conduit 23 may be at a temperature of up to 1,000° C. to allow for drying to the desired residual moisture level. The dried biomass is then fed via conduit 3 and rotary valve 4 to the inlet to a pressurized reactor 5 (also called torrefaction reactor). The torrefaction reactor 5 may operate at between 5 and 20 bar, and at an operating temperature of about 220-300° C. In other embodiments, the pressure may range from 1 to 50 bar (and all subranges therebetween), and the temperature may range between 100 and 1000° C. (and all subranges therebetween).

To raise the temperature of the dried biomass material (e.g., from 100 to 300° C.), heat is provided from heated reactor gas supplied via conduit 19. The heated reactor gas is comprised of a portion of the torrefaction gas (gas produced in the torrefaction reactor 5) which exits torrefaction reaction 5 via conduit 6 and which is recycled to the torrefaction reactor 5 (as recycled torrefaction gas via conduit 7) and a portion of the cyclone nitrogen rich gas via conduit 18.

The portion of the recycled torrefaction gas which is recycled to the torrefaction reactor 5 and any additional nitrogen rich gas can be heated in an indirect heat exchanger 20 by flue gas or other heating means in conduit 9 from the combustion unit 8 prior to use in the torrefaction reactor 5. A portion of the torrefaction gas (e.g., the portion in conduit 21) produced in the torrefaction reactor 5 can be sent to the combustion unit where the torrefaction gas is mixed with oxygen containing gas fed via conduit 12 from the Pressure Swing Adsorption (PSA) plant 11 and/or combustion air and/ or with utility fuel fed via conduit 22 (if needed) to produce combustion flue gas exiting via conduit 9 from combustion unit 8.

The combustion flue gas may be used as the heat source for the indirect heat exchanger 20 to heat the reactor gas provided to the torrefaction reactor 5 via conduit 19. The cooler combustion flue gas of stream 23 may be used in the drying unit 2 to dry the incoming biomass. The drying flue gas of conduit 24 produced from the drying process may be sent to further processing prior to disposal to the atmosphere or other acceptable disposal.

Torrefied biomass exiting via stream 25 from the torrefaction reactor 5 at a temperature of about 220 to 300° C. may be fed to a rotary valve 26 at the inlet to the fluidbed cooler 29 (or other direct contact cooler). The fluidbed cooler 29 may be a combination indirect cooler, using water as the cooling medium, and direct cooler, using cooled nitrogen rich stream 17 or any other inert gas from heat exchanger 16 and make-up nitrogen from the PSA (or other gas separation type equipment) plant 11 or any other inert gas to cool the torrefied biomass entering the fluidbed cooler 29 via stream 25 to about 90° C. in an oxygen free or near oxygen free environment. The cooled torrefied biomass may be discharged from the fluidbed cooler 29 via a rotary valve 30 (or similar device to assure the fluidbed cooler 29 operates in an oxygen-free, or substantially oxygen-free, environment). Cool torrefied biomass in stream 40 discharged from the fluidbed cooler 29 may be mixed with torrefied biomass solids stream 35 separated in the cyclone 32 (discharged through rotary valve 33 or other such equipment to ensure an oxygen-free or near oxygen-free environment is maintained in the cyclone 32) to produce a stream 37 for further processing in a pelletizing unit 38 or other product handling process for compacting or packaging the torrefied biomass solids.

The fluidbed cooler 29 may operate at near atmospheric pressure (e.g., the cooler may operate at a slight vacuum or slightly above atmospheric pressure) and may use indirect cooling from cooling water (noted as Cooling Water Supply (CWS) 27 and Cooling Water Return (CWR) 28) as well as direct cooling from the nitrogen rich gas in stream 17. The nitrogen rich gas in stream 17 may contain a portion of cyclone nitrogen rich gas in stream 36 combined with make-up nitrogen 13. Heat exchanger 16 can be supplied with cooling water as the indirect cooling medium or other available cooling material.

Fluidbed cooler gas in stream 31 from the fluidbed cooler 29 may be sent to cyclone 32 where cooled gas is separated from any entrained solids. The cooled gas in stream 34 may then be split into two or more portions. For example, cyclone nitrogen gas stream 34 may be split into two portions: (i) stream 18 which can be sent to heat exchanger 20 in the heating loop around the torrefaction reactor for mixing with stream 7 to feed the torrefaction reactor 5 and (ii) stream 36 which is fed to heat exchanger 16 to be cooled.

Air in conduit 10 may be provided to PSA Plant 11 where two gas streams are produced: make-up nitrogen stream 13 (a stream rich in nitrogen with little or no oxygen) and an oxygen rich stream 12 which is used together with utility fuel in the combustion unit.

While the description provided uses nitrogen as the gas in the heating and cooling loops where oxygen-free, or substantially oxygen-free, environments may be employed avoid explosive mixtures, any inert gas (for example argon or carbon dioxide, but nitrogen is preferred) can be used in place of nitrogen. The inert gas (e.g., nitrogen) is used in this process as a "carrier" gas, meaning the inert gas carries the heat needed in the torrefaction reactor and from the fluidbed cooler. Additionally, while the process may use a PSA Plant to separate nitrogen from air, any other method of separating nitrogen from air can also be used and is not a critical feature of this invention. It is also within the scope of the invention to use any source of nitrogen or other inert gas.

In the embodiment of FIG. 1, moreover, cooling water is described as the cooling medium in the indirect cooling services. In other embodiments, the cooling medium may be some medium other than water without impacting the important technical features of this process. That is, any fluid capable of effectively cooling may be employed.

In an aspect, a notable feature of this process is the ability to use nitrogen rich gas from the cyclone (which would otherwise be purged from the system) as part of the reactor gas for the torrefaction step. By using this nitrogen rich gas a balance can be established in the both the cooling loop and the heating loop with minimal addition of make-up nitrogen. This also means the torrefaction gas composition is used to set the operating conditions of the combustion unit by controlling the ratio of gas (via conduit 21) from the reactor going to the combustion unit versus gas (via conduit 6) produced by the reactor. This ratio—which may be expressed in either volumetric or molar terms—then influences the nitrogen needed for make-up as well as the quantity of utility fuel required. It is also preferable that the streams being recycled in both the heating and cooling loops remain oxygen-free or substantially oxygen-free. In an aspect, the described process of FIG. 1 may provide optimum equipment sizing, thereby saving capital investment, as well as improves the impact on the environment of the products from the process.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A system for the torrefaction of lignocellulosic material comprising:
   a dryer for drying lignocellulosic material adapted to remove at least of a portion of moisture contained within the lignocellulosic material;
   a torrefaction reactor adapted to operate at a pressure between 1 and 50 bar and at a temperature between 100 and 1000° C., wherein the torrefaction reactor generates torrefied biomass from the lignocellulosic material and generates torrefaction gas;
   a first recycle loop adapted to recycle torrefaction gas back to the torrefaction reactor;
   a cooler adapted to cool torrefied biomass, wherein the cooler is adapted to operate in a substantially oxygen-free environment;
   a second recycle loop adapted to recycle inert gas to the cooler and to provide inert gas to the torrefaction reactor; and
   a supply line adapted to supply inert gas for addition to the cooler;
   wherein the system is adapted to use the inert gas as at least a partial medium for transferring heat among the torrefaction reactor and the cooler.

2. The system of claim 1, wherein the cooler is a fluidbed cooler, and wherein the system further comprises a cyclone adapted to separate the cooled torrefied biomass from an inert gas.

3. The system of claim 1, wherein the inert gas comprises nitrogen.

4. The system of claim 1, wherein the dryer is adapted to remove moisture present in the lignocellulosic material such that an absolute moisture content of the lignocellulosic material is less than 15% of the total weight of the lignocellulosic material.

5. The system of claim 1, wherein the dryer employs energy received from a hot gas at a temperature of up to 1,000° C.

6. The system of claim 1, wherein the torrefaction reactor operates at between 5 and 20 bar.

7. The system of claim 1, wherein the torrefaction reactor operates at a temperature of about 220-300° C.

8. The system of claim 1 further comprising a pelletizer for compacting torriefied biomass solids obtained from the cooler.

9. The system of claim 1 further comprising an air separator for separating air into at least a first stream comprising oxygen and a second stream comprising nitrogen, wherein the nitrogen is used as the inert gas.

10. The system of claim 1 further comprising a combustion unit for combusting at least oxygen and a portion of the torrefaction gas produced in the torrefaction reactor.

11. The system of claim 10, wherein the combustion unit produces a flue gas supplied to the dryer for drying lignocellulosic material.

* * * * *